Patented Sept. 27, 1949

2,483,373

UNITED STATES PATENT OFFICE 2,483,373

PREPARATION OF HYDROCARBON-SUBSTITUTED HALOGENOSILANES

Eugene G. Rochow, Schenectady, N. Y., assignor to General Electric Company, a corporation of New York No Drawing. Application April 16, 1946, Serial No. 662,626

8 Claims. (Cl. 260—448.2)

The present invention relates to the preparation of organohalogenosilanes. It is particularly concerned with a method for the preparation of hydrocarbon-substituted halogenosilanes which comprises effecting reaction, at an elevated temperature, between silicon and a hydrocarbon halide in the presence of a hydrogen halide, e. g., hydrogen chloride, hydrogen bromide, hydrogen fluoride, etc.

It was known prior to my invention that hydrocarbon halides could be caused to react with elements other than silicon. For example, the reaction of hydrocarbon halides with magnesium in certain solvents to yield the so-called "Grignard reagent" is well known. Another example is the reaction of zinc or the zinc-copper couple with alkyl halides to give alkyl zinc halides similar in chemical behavior to the Grignard reagent. Zinc dimethyl also has been prepared by heating metallic zinc with methyl bromide or iodide in the liquid state in a sealed tube.

The reaction of hydrogen chloride with silicon also was known. Thus, Combes [Compt. rend., 122, 531 (1896)] obtained a mixture of approximately 80% trichlorosilane (silicochloroform) and 20% silicon tetrachloride by passing hydrogen chloride through an iron tube filled with silicon heated to 300° to 400° C.

In Rochow U. S. Patent 2,380,995, issued August 7, 1945, and assigned to the same assignee as the present invention, there is disclosed and broadly claimed the method of preparing organohalogenosilanes, more particularly hydrocarbon-substituted halogenosilanes, which comprises bringing a hydrocarbon halide into contact with heated silicon.

The present invention is based on my discovery that if the hydrocarbon halide is brought into contact with the heated silicon in the presence of, i. e., mixed with a hydrogen halide, for example hydrogen chloride, and the reaction between the silicon and the hydrocarbon halide component of the gaseous mixture otherwise allowed to proceed in accordance with the teachings of the above-mentioned Rochow patent, certain unexpected and desirable results are obtained.

The use of the hydrogen halide in the above-described manner permits better control of the reaction and, in general, at a given temperature, results in increased yields of hydrocarbon-substituted halogenosilanes over those obtained when reaction is effected between the silicon and the hydrocarbon halide in the absence of the hydrogen halide.

The hydrogen halide, such as hydrogen chloride, may be mixed with a hydrocarbon halide which is in the vapor state or it may be passed over, or bubbled through, a reservoir of a liquid hydrocarbon halide held at any desired temperature. With many of the hydrocarbon halides, this latter method, in which the hydrogen halide, preferably in the gaseous state, may also function as a carrier for the reactive hydrocarbon halide vapor is preferred, since the rate of flow of the gaseous mixture through the apparatus can be controlled by regulating the rate of flow of the hydrogen halide into the reservoir while the amount of the reactive hydrocarbon halide carried into contact with the heated silicon by the hydrogen halide can be controlled by varying the temperature of the hydrocarbon halide, i. e., the vapor pressure of the hydrocarbon halide.

Although the hydrogen halide may be mixed with the hydrocarbon halide reactant in all proportions by weight or by volume, the actual amount of the hydrogen halide used will depend upon the desired ratio of hydrocarbon groups to halogen atoms in the product. Thus, in preparing the hydrocarbon-substituted halogenosilanes, I may advantageously use from about 0.01 mol to 2 or more mols of the hydrogen halide per mol of hydrocarbon halide employed. Preferably, for each mol of hydrocarbon halide used in the reaction, I may mix or employ from approximately 0.1 to 1 mol of the hydrogen halide. As the amount of hydrogen halide present in the reaction zone increases over 1 mol (per mol of the hydrocarbon halide), the amount of $SiCl_4$ also tends to increase. On a weight basis, the preferable amount of the hydrogen halide employed in the production of a mixture of hydrocarbon-substituted halogenosilanes, especially the monohydrocarbon-substituted trihalogenosilanes, is advantageously about 1% to 40% based on the amount (weight) of the hydrocarbon halide used in the reaction.

In order that those skilled in the art may better understand how the present invention may be practiced, the following examples are given by way of illustration and not by way of limitation. All parts are by weight.

*Example 1*

A glass reaction tube was filled with a crushed alloy comprising approximately 50% copper and 50% silicon. The tube was heated to a temperature of about 370° C. and a condensing tube, held at a temperature of —80° C. was affixed to the outlet of the reaction tube. Anhydrous hydrogen chloride was first passed through the heated tube and thereafter a mixture in a ratio of approximately one volume of hydrogen chloride to fifty volumes of methyl chloride was passed through the tube for about 8 hours. The liquid condensate was stirred into a mixture of ice water and ether where it hydrolyzed to give an ether-soluble condensation product which was identified as a methyl polysiloxane. Heating of this sticky, liquid polysiloxane yielded a clear, colorless, substantially solid, resinous body.

Using the same apparatus and a similar copper-silicon charge as above, a mixture of methyl chloride and hydrogen chloride in a ratio of about seven volumes of the former to one volume of the latter was passed through the tube for about one hour while the tube was heated at a temperature of about 360° C. The rate of flow of methyl chloride was then increased to twenty volumes per volume of hydrogen chloride. This increased rate of flow was maintained at the same temperature (360° C.) for about one hour. The condensate was poured into a stirred mixture of ether and ice water and the ether layer was decanted and evaporated leaving a colorless, viscous, liquid methyl polysiloxane which could be hardened to a clear, colorless, resinous mass.

Example 2

A glass reaction tube was filled with powdered silicon (60 to 80 mesh). The tube was heated to a temperature of about 380° C. and methyl chloride was passed through the tube for 24 hours at a rate of about 80 cc. per minute while maintaining temperature of the tube at approximately the aforementioned temperature. The effluent reaction products were passed through a trap cooled by a mixture of dry ice and acetone. The unreacted methyl chloride and other highly volatile products boiling at temperatures below 25° C. were removed from the condensate and the remaining liquid was fractionally distilled to give a mixture having a boiling point range of about 55–70° C. containing trimethylchlorosilane, dimethyldichlorosilane and methyltrichlorosilane. This mixture of methylchlorosilanes was hydrolyzed in ice and ether to yield a small amount of a clear, ether-soluble methyl polysiloxane resin.

Example 3

Using the same apparatus and temperatures as were employed in Example 2, and filling the glass tube with powdered silicon (60 to 80 mesh), methyl chloride and anhydrous hydrogen chloride, in a ratio of about 1 to 1, by volume of the gases, were passed over the heated silicon for about 24 hours at a rate of about 120 cc. of the mixture of gases per minute. The condensate, collected and worked up as in Example 2, was fractionally distilled, yielding a distillate corresponding to the boiling point range of a mixture containing trimethylchlorosilane, dimethyldichlorosilane and methyltrichlorosilane (boiling point range is approximately 55–70° C.). This mixture was hydrolyzed with ice and ether to yield a clear, ether-soluble methyl polysiloxane resin. The amount of this resin was about fifty times that of the resin obtained in Example 2.

Example 4

Example 3 was repeated except that the amount of hydrogen chloride mixed with the methyl chloride was much less, namely, about 5% of the volume of the total mixture of methyl chloride and hydrogen chloride gases entering the reaction tube was hydrogen chloride. After 24 hours, the collected product was worked up in the same fashion as was done in the foregoing Examples 2 and 3, and the fraction boiling between 55–70° C. was hydrolyzed in ice and ether to yield a clear, ether-soluble methyl polysiloxane resin, the amount of which, by weight, was about five times that obtained when hydrogen chloride was omitted (see Example 2).

Example 5

Approximately 1300 parts silicon crushed to about 325 mesh was fired and sintered in hydrogen at 1350° C., and then broken into small lumps. These lumps were packed into a glass tube about 5 feet long and 1¾ inches wide. Chlorobenzene (monochlorobenzene) was allowed to drip slowly into the tube so that it passed through the tube in the form of vapor at a rate of about 32 grams per minute for 132 hours until about 4158 parts chlorobenzene had been introduced. The temperature during the passage of the chlorobenzene was maintained at from 560–580° C. The condensate, which was collected at the exit end of the tube in a low-temperature trap, was distilled and the fraction boiling above 132° C., the boiling point of chlorobenzene, was removed. This fraction was in turn fractionally distilled to separate the phenyl chlorosilanes, i. e., phenyl trichlorosilane, diphenyl dichlorosilane, and triphenyl chlorosilane. Analysis showed that only about 7.6% of the fraction boiling above 132° C. comprised the phenyl chlorosilanes, the balance of the fraction comprising large amounts of biphenyl, chlorinated biphenyls, etc. Based on the total amount of the condensate obtained in the reaction, the per cent of phenyl chlorosilanes was only 1.4%. It is to be noted that about 86% of the condensate was recovered as unreacted chlorobenzene.

Example 6

Using a similar charge of silicon and the same amount as in Example 5, chlorobenzene and anhydrous hydrogen chloride were passed into the tube simultaneously for 167 hours while the tube was heated at a temperature of about 490–515° C. The approximate mol ratio of the hydrogen chloride and the chlorobenzene was about 1 to 2. This represented a passage, per minute of about 2.72 parts gaseous hydrogen chloride to about 16.1 parts chlorobenzene. In all about 2710 parts chlorobenzene and about 450 parts hydrogen chloride were passed through the tube. The condensate comprising about 2879 parts was subjected to distillation and the fraction boiling above 132° C. was removed. This fraction, about 273 parts, was fractionally distilled to obtain about 205 parts of a mixture of phenyl chlorosilane, of which more than 80% was shown, by analysis, to be phenyl trichlorosilane. The amount of phenyl chlorosilanes represented a yield of about 75% based on the weight of the fraction boiling above 132° C. and a yield of about 6.9% based on the weight of the total condensate obtained in the reaction.

Example 7

Finely ground silicon (325 mesh) was pressed into the shape of small pellets and then packed into a glass tube. Chlorobenzene and anhydrous hydrogen chloride were passed simultaneously through the tube for 116 hours while the tube was heated at a temperature of 436–445° C. The chlorobenzene was passed through at a rate of approximately 13.8 parts per minute and the hydrogen chloride at a rate of approximately 1.92 parts per minute, representing a mol ratio of about 2.3 to 1. In all, about 1590 parts chlorobenzene and 223 parts hydrogen chloride were put through the tube. The condensate, 1678 parts, was subjected to distillation to isolate the portion boiling above 132° C. This fraction (230 parts, by weight) was fractionally distilled to obtain about 116 parts of a mixture of phenyl chlorosilanes. Analysis showed that most of this mixture was phenyl trichlorosilane with a small amount of diphenyl dichlorosilane and a lesser amount of triphenyl chlorosilane. The amount of phenyl chlorosilanes represented a yield of about 50% based on the weight of the fraction boiling above 132° C. and a yield of about 7% based on the amount of the total condensate obtained from the reaction between the chlorobenzene and the silicon.

Example 8

Chlorobenzene and anhydrous hydrogen chloride, in a mol ratio of about 10 to 1, were passed over silicon which had been prepared and packed in a glass tube as in Example 5 for 66 hours at a temperature of about 400° C. The average rates of flow of the materials were above 13 parts per minute of chlorobenzene and 0.43 part of hydrogen chloride per minute. This represented a passage of about 870 parts chlorobenzene and 28.3 parts of the hydrogen chloride for the 66 hours. The condensate was collected and distilled, and the fraction boiling above 132° C. was isolated. This latter fraction was fractionally distilled to obtain a mixture of phenyl chlorosilanes. The phenyl chlorosilane fraction, containing for the most part phenyl trichlorosilane and small amounts of diphenyl dichlorosilane and triphenyl chlorosilane, represented a yield of about 48% based on the fraction boiling above 132° C. and a yield of about 2.84% based on the weight of the total condensate from the reaction. By maintaining the low molar ratio of hydrogen chloride to chlorobenzene, the amount of $SiCl_4$ obtained in the condensate was cut down to a minimum. Thus, in this example, only a trace of $SiCl_4$ was detected during the distillations.

Example 9

Finely ground copper powder and finely ground silicon, in a weight ratio of about 1 to 9, were thoroughly mixed and then pressed into the shape of small pellets which were packed into a glass tube. Chlorobenzene and gaseous anhydrous hydrogen chloride were passed over the silicon-copper mass in a mol ratio of about 7 to 1 for 72 hours while the temperature of the tube was maintained at 430–450° C. The average rates of input of the two materials were 21.5 parts per minute of chlorobenzene and one part of hydrogen chloride per minute. In all, about 72 parts of hydrogen chloride and 1550 parts of chlorobenzene were employed in the reaction. The condensate (1492 parts) was distilled and the fraction boiling above 132° C. was isolated. This fraction (168 parts) was in turn distilled to obtain fractions containing the phenyl chlorosilanes, which on analysis were found mainly to comprise phenyl trichlorosilane with smaller amounts of diphenyl dichlorosilane and triphenyl chlorosilane. These phenyl chlorosilanes represented a weight of 132 parts, or a yield of about 79% based on the weight of the fraction boiling above 132° C. and about 8.8% based on the weight of the total condensate from the reaction. Here again, as in Example 8, by using a low molar ratio of hydrogen chloride to chlorobenzene, only a small amount of $SiCl_4$ was formed in the reaction mixture.

When chlorobenzene was passed over a silicon-copper contact mass comprising as much as 20% by weight of copper, in the absence of anhydrous hydrogen chloride, smaller amounts of phenyl chlorosilanes were obtained than when the hydrogen halide was present. Even when the temperature was raised to about 590° C., only a slight increase in the yield of phenyl chlorosilanes was noted over that obtained at lower temperatures. In every experiment the use of the hydrogen halide increased markedly the yields of phenyl halogenosilanes over the yields obtained when the hydrogen halide was omitted.

It is of course understood that my invention is not limited to the specific hydrocarbon halides named in the above illustrative examples. Examples of hydrocarbon halides other than methyl chloride and chlorobenzene (monochlorobenzene) which may be caused to react with silicon at elevated temperatures in the presence of a hydrogen halide with comparable results are higher alkyl halides, e. g., ethyl chloride, ethyl bromide, propyl chloride, etc.; the aryl halides other than chlorobenzene, e. g., monobromobenzene, chloronaphthalene, etc.; and the hydrocarbon dihalides, such as methylene chloride, ethylene chloride, ethylene bromide, dichlorobenzene, etc.

The reaction may also be carried out in the presence of metallic catalysts other than copper for the reaction between the hydrocarbon halide and silicon, e. g., nickel, tin, antimony, manganese, silver, titanium, etc. Additional information concerning the use of the catalysts will be found in the aforementioned Rochow U. S. Patent 2,380,995.

The preferred reaction temperatures, i. e., the temperatures at which substantial yields of the hydrocarbon-substituted halogenosilanes are obtained depend, in general, on such influencing factors as, for instance, the particular starting materials employed, the other reaction conditions, type of reactor, etc. The preferable range is from 200° to 500° C; optium results usually are obtained within the more limited range of 250° to 425° C.

Although hydrogen chloride has been used in the above examples, it is to be understood that other hydrogen halides, e. g., hydrogen bromide, hydrogen fluoride, etc., may be substituted for the hydrogen chloride used in the foregoing illustrative examples. Hydrogen chloride, for economical reasons, and because of its availability, is preferred.

When there are employed hydrogen halides in which the halogen is different from the halogen present in the hydrocarbon halide, certain amounts of hydrocarbon-substituted halogenosilanes will be obtained wherein the halogens present in the hydrocarbon-substituted halogenosilanes will be different; that is, one halogen may be derived from the hydrogen halide and the other halogen may be derived from the hydrocarbon halide. Such a situation will exist since the silicon atoms will combine at random with the halogen atoms present in the zone of reaction whether alike or different.

From the results obtained in the foregoing examples, it is apparent that my invention is well-suited to obtain improved yields of hydrocarbon-substituted trihalogenosilanes than are possible in the absence of a hydrogen halide under comparable conditions.

What I claim as new and desire to secure by Letters Patent of the United States is:

1. The method which comprises effecting reaction at an elevated temperature between silicon and the aryl halide component of a mixture comprising an aryl halide and hydrogen chloride.
2. The method which comprises effecting reaction, in the presence of a hydrogen halide, between heated silicon and chlorobenzene.
3. The method as in claim 2 wherein the hydrogen halide and the chlorobenzene are both substantially in the gaseous state while reacting with the silicon.
4. The method of preparing phenyl-substituted halogenosilanes which comprises effecting reaction, in the presence of a hydrogen halide, between the vapor of monochlorobenzene and silicon while the components are intimately associated with a metallic catalyst for the reaction.
5. The method of preparing phenyl-substituted chlorosilanes which comprises effecting reaction, in the presence of hydrogen chloride, between the vapor of chlorobenzene and silicon while the components are intimately associated with copper.
6. The method which comprises effecting reaction at an elevated temperature between silicon and an aryl halide in the presence of a hydrogen halide.
7. The method of forming an arylhalogenosilane which comprises passing a mixture of an aryl halide and a hydrogen halide over heated silicon.
8. The process which comprises passing a mixture comprising hydrogen chloride and chlorobenzene over heated silicon at a temperature of from 200° to 500° C. while the silicon is intimately associated with a catalyst comprising finely divided silver, and thereafter isolating the formed phenylchlorosilanes.

EUGENE G. ROCHOW.

REFERENCES CITED

The following references are of record in the file of this patent:

UNITED STATES PATENTS

| Number | Name | Date |
|---|---|---|
| 2,380,995 | Rochow | Aug. 7, 1945 |
| 2,380,996 | Rochow | Aug. 7, 1945 |
| 2,380,997 | Patnode | Aug. 7, 1945 |
| 2,380,998 | Sprung | Aug. 7, 1945 |
| 2,380,999 | Sprung | Aug. 7, 1945 |
| 2,381,000 | Patnode | Aug. 7, 1945 |
| 2,381,001 | Patnode | Aug. 7, 1945 |
| 2,381,002 | Patnode | Aug. 7, 1945 |
| 2,383,818 | Patnode | Aug. 28, 1945 |
| 2,389,931 | Reed et al. | Nov. 27, 1945 |

OTHER REFERENCES

Rochow: Jour. Amer. Chem. Soc., vol. 67 (1945), page 1772.

Combes: Compt. rend., vol. 122 (1896), page 531.